March 17, 1953 P. RAVIGNEAUX 2,631,476
EPICYCLIC CHANGE-SPEED GEAR
Filed July 22, 1950 8 Sheets-Sheet 1
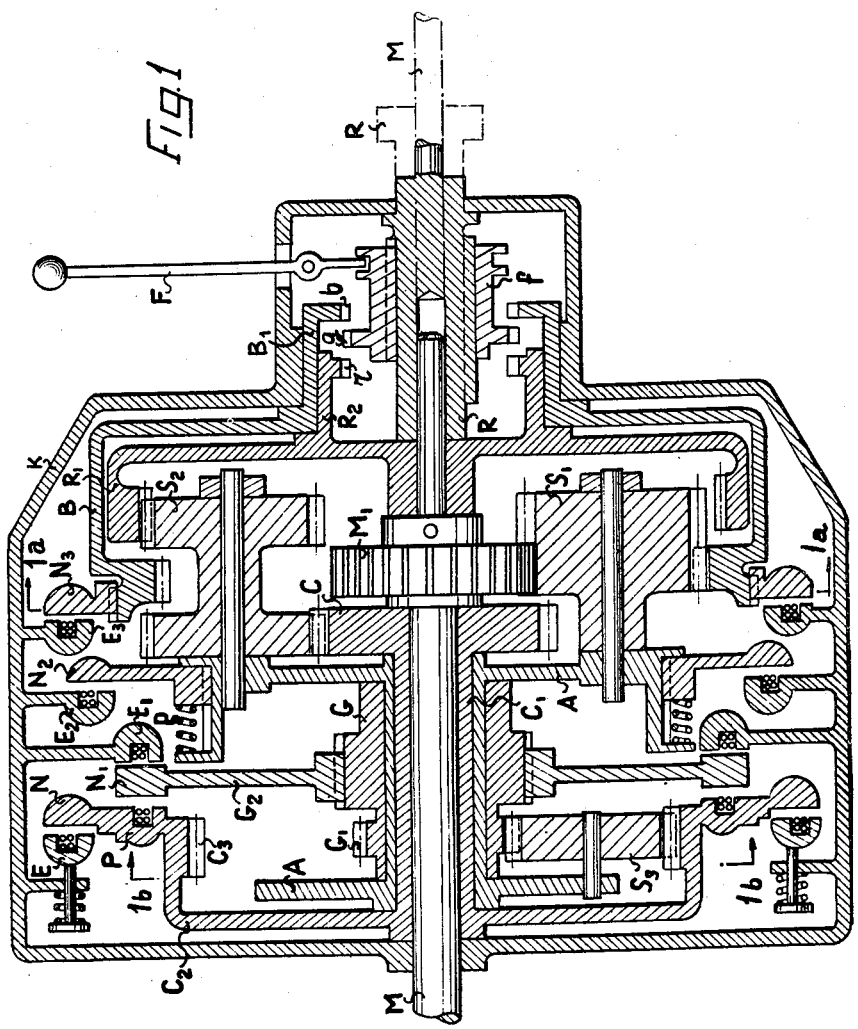
Inventor:
Pol Ravigneaux
By Brown & Seward
Attorneys March 17, 1953   P. RAVIGNEAUX   2,631,476
EPICYCLIC CHANGE-SPEED GEAR
Filed July 22, 1950   8 Sheets-Sheet 2

Inventor
Pol Ravigneaux
By Brown + Seward
Attorneys

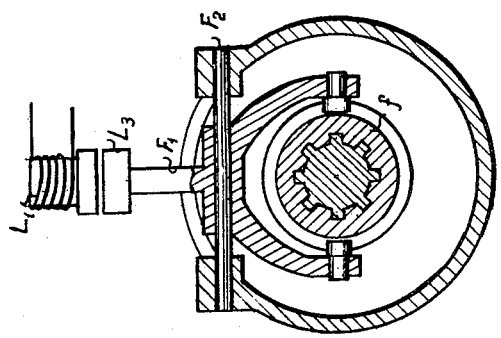
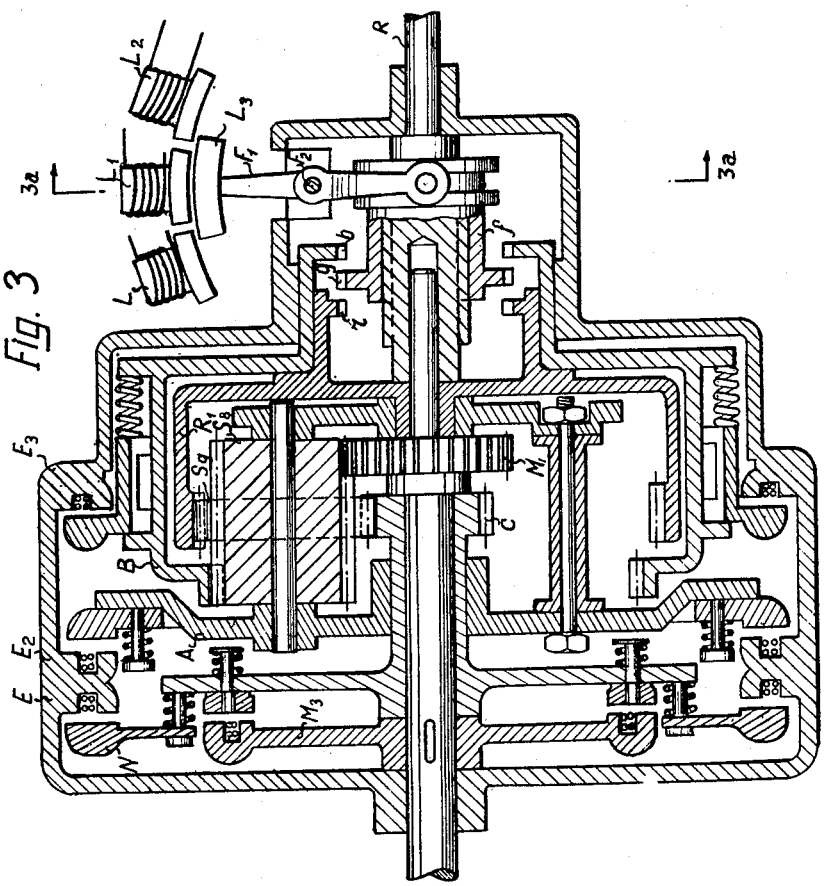

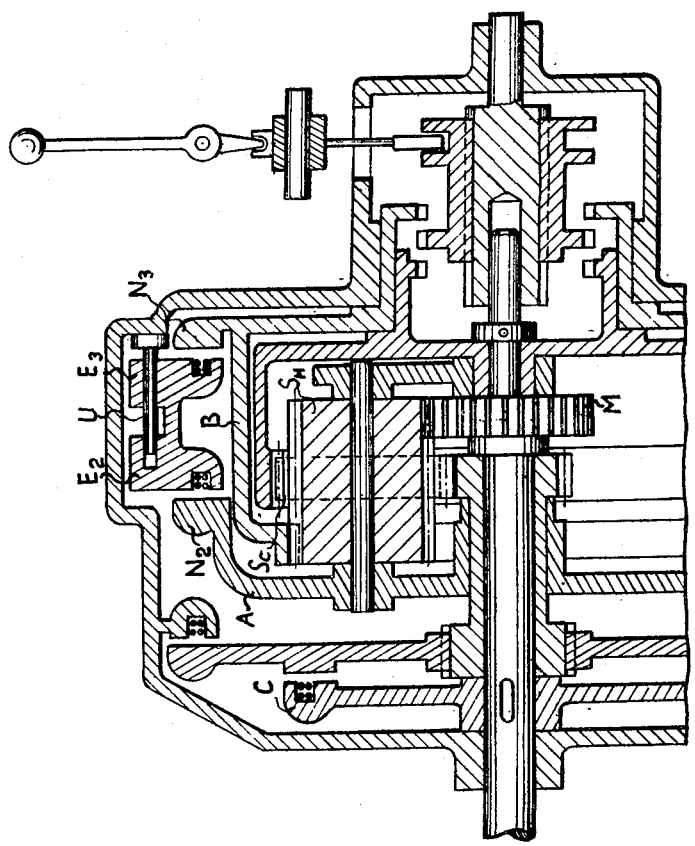

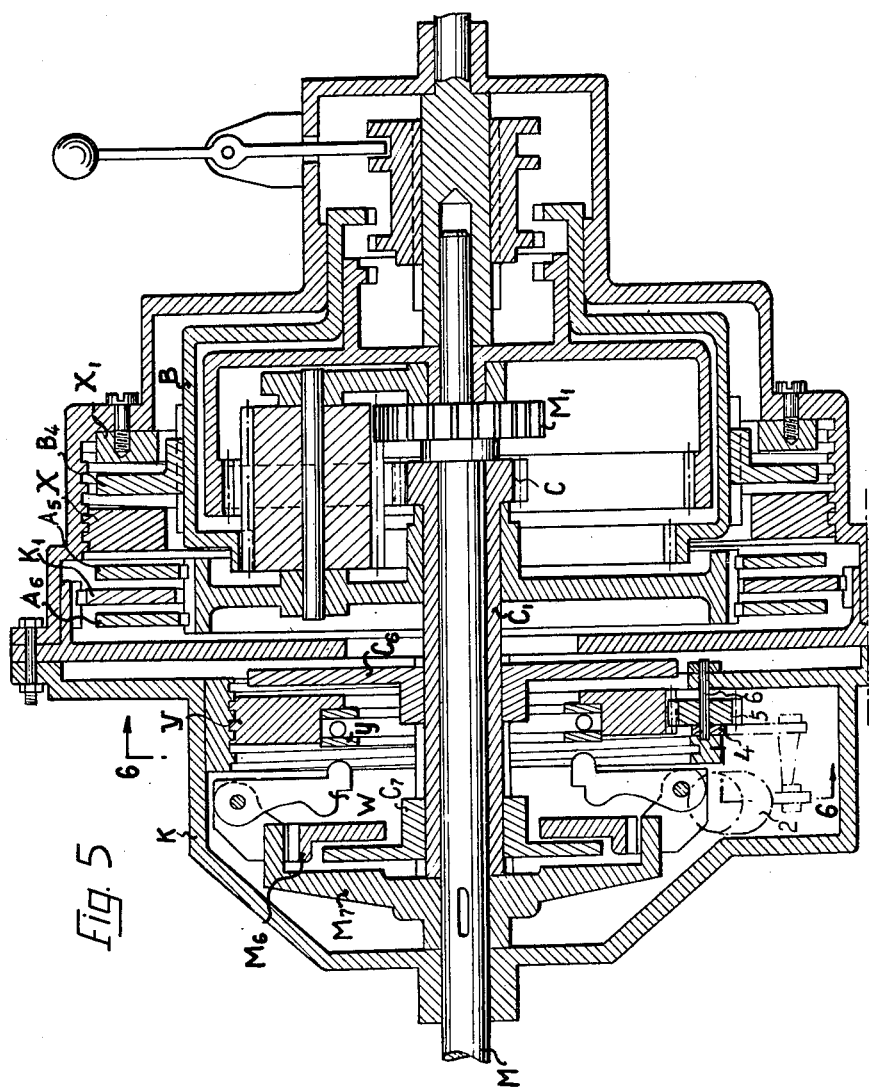

March 17, 1953  P. RAVIGNEAUX  2,631,476
EPICYCLIC CHANGE-SPEED GEAR

Filed July 22, 1950  8 Sheets-Sheet 7

Inventor
Pol Ravigneaux
By Brown + Seward
Attorneys

March 17, 1953 — P. RAVIGNEAUX — 2,631,476
EPICYCLIC CHANGE-SPEED GEAR
Filed July 22, 1950 — 8 Sheets-Sheet 8

Inventor:
Pol Ravigneaux
by Brown & Renard
Attorneys

Patented Mar. 17, 1953

2,631,476

UNITED STATES PATENT OFFICE 2,631,476

EPICYCLIC CHANGE-SPEED GEAR

Pol Ravigneaux, Neuilly-sur-Seine, France

Application July 22, 1950, Serial No. 175,319
In France July 28, 1949

11 Claims. (Cl. 74—759)

This invention relates to epicyclic change-speed gears in which the driving and driven shafts have common axis and in which the gear comprises two epicyclic trains, each of which is constituted by a central wheel linked with one crown-wheel through one single planet pinion.

Both planet pinions have their axles mounted on a same carrier which is called a "planet carrier" and mesh with one another.

The central wheel and the crown-wheel of one train are located on either side of the zone within which the central wheel and crown-wheel of the other train mesh with the planet-pinion interconnecting the latter.

In other words, one planet-pinion interconnecting one central wheel to one crown-wheel overlaps the zone in which the other central wheel and crown-wheel mesh with their planet-pinion.

It may also be said that the epicyclic set thus defined which includes all rotary members of the 4-speed device and which constitutes the complex wheel-train called thereafter "main train of the 5-speed device" comprises two "overlapping trains."

The gear according to the invention may also be considered as comprising five concentric members, viz. two central wheels, two innerly toothed crown-wheels and a planet-carrier, the latter carrying at least two planet-pinions meshing with one another, one of said pinions also meshing with one of said central wheels and one of said wheels, while the other pinion also meshes with the other central wheel and with the other crown-wheel, any two of these coaxial members being adapted to be made rotatively fast with the driving shaft and driven shaft, respectively, while the other members are loosely mounted on their axles, means being provided to prevent selectively one of said three loose coaxial members from rotating.

In the change-speed gears of this type, each forward speed and the backward or reversed drive are obtained by stopping or holding stationary any single coaxial member, so that, in particular in the case of electro-magnetic gear-boxes, it suffices to energize one single electro-magnet for obtaining the required speed.

The invention has for its object to provide improvements in or relating to change-speed gears of the type described.

In such change-speed gears, to obtain either the four usual speeds or the reversed drive, the driving shaft must be clutched selectively with either central wheel or otherwise a direct shaft-to-shaft transmission must be renounced. Both solutions give rise to difficulties and drawbacks and another particular object of the invention is to overcome the same.

According to one feature of the invention, both crown-wheels of the epicyclic train are provided with hubs adapted to be juxtaposed on the same side of the box. In particular, this result may be obtained by giving preferably to the bodies of said crowns the shape of bells fitting in one another. Thanks to this arrangement, it is possible, in particular, according to another feature of the invention, to provide said hubs with means to obtain their selective connection with the driven shaft.

According to another feature of the invention, each hub is provided with dogs or the like and a member is slidably, but non-rotatively, mounted on the driven shaft, said member carrying dogs or the like complementary to those provided on the hubs and capable of being selectively engaged with either crown-wheel.

This arrangement permits, in particular, when the above-mentioned slidable member is brought into a neutral position, to displace the car without moving any member of the gear-box.

Moreover, the arrangement of the dogs on the "driven" side permits bringing nearer the engine the cumbersome parts of the gear-box, which is a considerable advantage in particular when using the change-speed gear on a motorcar.

According to still another feature of the invention, the means to stop or to hold stationary the loose members of the change-speed gear, which will be called thereafter in the specification as well as in the claims "holding means," and which may be clearly of any suitable type within the scope of the invention, are constituted by the electro-magnets.

According to a further feature of the invention, any one of the planet-pinions meshing with one central wheel and with one crown-wheel is provided with a cut-off portion so as to permit using a larger diameter for the second central wheel or a smaller diameter for the second crown-wheel.

According to one embodiment, the planet-pinion which meshes with the loose central wheel and with the crown-wheel driven for the forward speeds is provided with a cut-off portion, which permits giving to that portion of said planet-pinion which is located on the "engine" side and to the loose central wheel a width smaller than that of the other wheels, since the tangential stress exerted upon their toothing is weaker.

According to still another feature of the invention, the five coaxial members and the two planet-pinions are so mounted as to be incapable of moving axially and means are provided to hold selectively the loose members stationary by causing a relative sliding motion between said loose members and the parts which are used to hold them stationary.

In the last mentioned case, helical toothings are preferably used, which permits reducing the gear noise. It will be also noted that these arrangements facilitate the drawback of the sliding members, e. g. by elastic means, towards their inoperative position which, in the case of electro-magnetic change-speed gears, permits counteracting the remanence effects tending to keep stationary the members which should be released.

According to a further feature of the invention, both crown-wheels have substantially the same diameter, the cut-off planet pinion being that which meshes with the driving central wheel and the backward-drive driven crown-wheel.

According to a further feature of the invention, all electro-magnet armatures are independ of each other, each armature being mechanically held off its electro-magnet as long as it is not operative under the action of elastic means, this action being limited by abutments.

According to still another feature of the invention, the change-speed gear is completed by a 5th speed, e. g. geared up, obtained by means of a complementary member capable of being held stationary and pertaining to a complementary train, the two other members of which are each interconnected with one member of the 5-speed main train, as described above.

According to still another feature of the invention, said complementary element may be either held stationary to obtain a new ratio either rotatively fast for the direct drive with any member of the main train and, in particular, with the loose central wheel.

According to one embodiment, the complementary train is constituted by a crown-wheel adapted to be held stationary by a central wheel rotatively fast with the loose wheel of the main train and by at least a planet-pinion, the axle of which is carried by the main train planet-carrier.

According to yet another feature of the invention, the planet-carrier of the complementary train is rotatively fast either with the driving member or with the member which is held stationary to obtain the 3rd speed, or again with the member which is held stationary to obtain the 5th speed.

Thanks to this arrangement, it is always possible to avoid the presence of three concentric members surrounding the driving shaft, which constitutes, from the constructive point of view, an important simplification.

Moreover, thanks to the use for the complementary train of a planet-carrier separate from the main train planet-carrier, it is possible to use said complementary train in such a manner that the 5th speed obtained by means of this train may be either geared up or, on the contrary, geared down, the ratio of said geared down speed being chosen at will so as to obtain a ratio either lower than all other ratios of the box or comprised between any two of said ratios.

According to still another feature of the invention, the change-speed gear is completed by an auxiliary train to provide the reversed drive without clutching the driven shaft selectively with two different members.

According to a further feature of the invention, the driving shaft is mounted within the driven shaft, so as to dispose the engine and the final driven member fast with the driven shaft on the same side of the box.

In order that my invention may be clearly understood and readily carried into effect, the same will now be more fully described with reference to the accompanying drawings, in which:

Fig. 1 is an axial sectional view of an embodiment of the change-speed gear-box according to the invention and comprising the essential features thereof.

Fig. 3 is an axial section showing a third embodiment of the invention.

Fig. 3a is a section along line 3a—3a of Fig. 3.

Fig. 4 is an axial section showing a change-speed gear-box, according to the invention, of a more simple construction.

Fig. 5 shows a mechanically controlled gear-box according to the invention.

Figure 11:
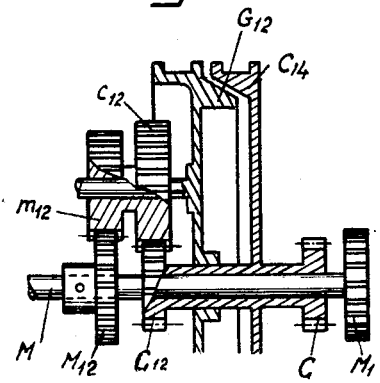
Figure 12:
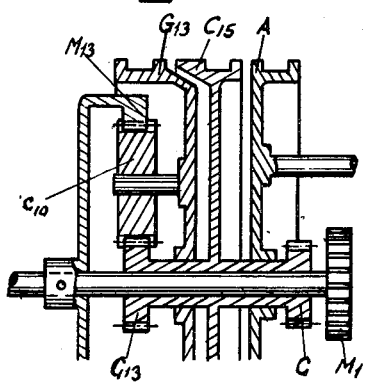

Fig. 11 is a similar view in which the 5th speed is still a geared-up speed and in which the planet-carrier of the complementary train is constituted by a disc which may be directly held stationary to provide said 5th speed and Fig. 12 is a similar view in which the planet-carrier of the complementary train is capable of being held stationary as that of the Fig. 11, said complementary train providing, however, a reduced speed.

Figure 1A:
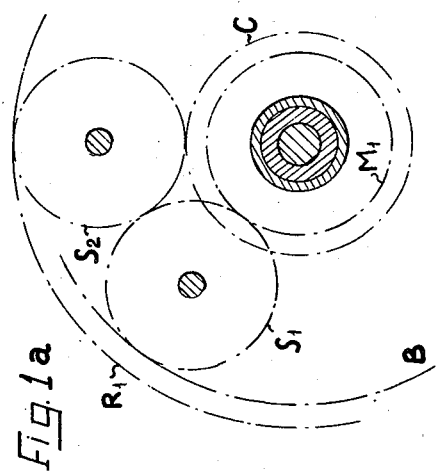
Fig. 1a is a diagrammatical partial cross-section along line 1a—1a of Fig. 1.
Figure 1B:
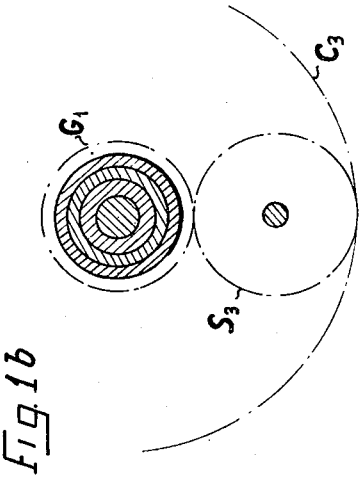
Fig. 1b is a similar cross-section along line 1b—1b.

Referring first to Figs. 1, 1a, 1b, there is shown at M the driving shaft, at $M_1$ a central wheel fast therewith, at R the driven shaft and at K the casing of the gear-box. A second central wheel C is loosely mounted on shaft M through a sleeve $C_1$, said sleeve also supporting a flange $C_2$. The two inwardly toothed crown-wheels of the main train are shown at B and $R_1$, respectively, the bodies of both said crown-wheels being constituted by bell-shaped members fitting in one another. Hub $R_2$ of crown-wheel $R_1$ and hub $B_1$ of crown-wheel B are provided with dogs $r$ and $b$. A sleeve $f$ slidably but non-rotatively mounted on driven shaft R is provided with corresponding dogs $g$ by means of which, when sleeve $f$ is slid, either crown-wheel may be made fast with shaft R. The sliding of sleeve $f$ may be provided in any suitable manner, e. g. by means of a lever F.

There is shown at A a planet-carrier loosely mounted on shaft M and carrying two planet-pinions $S_1$ and $S_2$ meshing with one another. It will be seen that, for the sake of clearness, the two planet-pinions are shown in Fig. 1, the first one at the lower end and the other at the upper end of Fig. 1, Fig. 1a showing their true position. Planet-pinion $S_1$ which meshes with the driving central wheel $M_1$ and with the reversed drive outer crown-wheel B also meshes with planet-pinion $S_2$ which is, in turn, geared with the outer crown-wheel $R_1$ and with the loose central wheel C.

In the example of Fig. 1, planet-pinion $S_2$ is provided with a cut-off portion and the toothing of crown-wheel B the diameter of which is equal to or smaller than that of crown-wheel $R_1$ is engaged in said cut-off portion.

In the example of Fig. 1, there is provided besides the usual reversed drive and four forward speeds, a 5th geared-up speed.

In this example, the said 5th speed is obtained by means of a complementary train the three members of which comprise a central wheel $G_1$ capable of being held stationary, a crown-wheel $C_3$ fast with wheel C of the main train and a planet-carrier which is common with that of the main train. Planet-pinion $S_3$ carried by said planet-carrier meshes with wheel $G_1$ and with crown-wheel $C_3$ carried by flange $C_2$.

A disc $G_2$ rotatively fast with wheel $G_1$ through a hug G carries holding means such as an armature $N_1$ capable of being pulled by a stationary electro-magnet $E_1$.

In the example shown, the various loose members are held stationary by electro-magnetic means. For this purpose, casing K carries four electro-magnets E, $E_1$, $E_2$, $E_3$, respectively, adapted to act in combination with the armatures N, $N_1$, $N_2$ and $N_3$, respectively. Moreover, flange $C_2$ carries a 5th electro-magnet P adapted to act upon the same armature $N_1$ as electro-magnet $E_1$.

It will be seen that in the example of Fig. 1, all coaxial members of the change-speed gear are so mounted that they are prevented from sliding in axial direction, the various armatures being slidably but non-rotatively mounted with respect to the various corresponding loose members.

This arrangement permits using helical toothings the advantages of which are well known in the art.

The gear-box shown in Fig. 1 operates as follows:

The reversed drive is obtained by energizing the stationary electro-magnet $E_2$ to hold the planet-carrier stationary after having slided sleeve $f$ rightwards from the neutral position shown to clutch the driven shaft with the crown-wheel B.

It will be easily understood that with such a clutching, the central wheel $M_1$ rotates the planet-pinion $S_1$, the axle of which is held stationary and thence, in the opposite direction, the crown-wheel B which has just been clutched with the driven shaft R. It is clear that crown-wheel $R_1$ as well as the central wheel C rotate freely.

The 1st speed is also obtained by holding the planet-carrier A stationary but only after driven shaft R has been clutched with the crown-wheel $R_1$ by sliding sleeve $f$ leftwards. With this clutching, the central wheel $M_1$ rotates, through planet-pinion S, the planet-pinion $S_2$ which rotates in turn crown-wheel $R_1$, the crown-wheel B as well as the central wheel C then rotating freely.

The 2nd speed is obtained by energizing electro-magnet $E_3$, thus holding the crown-wheel B stationary. It is clear that, as mentioned above, the driven shaft is clutched, for all forward speeds, with the crown-wheel $R_1$. With this clutching, the central wheel $M_1$ rotates the planet-pinion $S_1$ which takes a bearing on the stationary crown-wheel B. The planet-carrier A is thus rotated and planet-pinion $S_2$ follows and rotates the crown-wheel $R_1$ with a higher ratio.

The 3rd speed is obtained by energizing electro-magnet E to hold the central wheel C stationary.

The electro-magnet E then moves towards armature N, thus holding wheel C stationary. Since said wheel C acts as a stationary bearing point, the rotation of the driving wheel $M_1$ rotates the planet-carrier A with a well defined speed and wheel $R_1$, due to its meshing with planet-pinion $S_2$, also rotates at a well defined speed corresponding to a new geared down ratio.

The 4th speed, i. e. the direct drive, is obtained by energizing electro-magnet P to make the central wheel C and disc $G_2$ fast with one another Thus, the whole epicyclic gear is stopped and the planet-carrier A is made fast with the central wheel C, through the planet-pinion $S_2$. The central wheel $M_1$ therefore rotates the crown-wheel $R_1$ and the driven shaft R through the planet-pinions $S_1$ and $S_2$ then held stationary with respect to one another, due to the fact that the planet-carrier A is fast with the central wheel C.

It is particularly noted that, with this embodiment, the power of electro-magnet P is reduced due to the fact that the value of the torque required for making members C and G fast with one another is a very small portion of the driving torque; however, any two other members of the train might be made fast with one another as well.

The geared up 5th speed is provided by energizing electro-magnet $E_1$ to hold disc $G_2$ stationary; it will be easily understood that, when the central wheel $G_1$ of the auxiliary train is held stationary, the planet-pinion $S_3$ takes a bearing upon this last wheel, thus acting as a reaction means, and rotates the planet-carrier A as well as wheel $R_1$ at a speed higher than that of the driving shaft, thus giving a geared up 5th speed.

In the example shown, the following numbers of teeth have been chosen:

Driving central wheel $M_1$ _____ 16
Loose central wheel C _____ 22
Planetary pinion $S_1$ _____ 15
Planetary pinion $S_2$ _____ 19
Crown-wheel B _____ 56
Crown-wheel $R_1$ _____ 60 while the diameter ratio between the central wheel $G_1$ and the crown-wheel $C_3$ of the auxiliary train is 1/3:4. There is thus provided the following ratios:

| | |
|---|---|
| Reversed drive | −0.285 |
| 1st speed | 0.267 |
| 2nd speed | 0.429 |
| 3rd speed | 0.576 |
| 4th speed | 1 |
| 5th speed | 1.5 |

The above ratios are clearly given as a mere illustration although they seem to give a very favorable range.

As mentioned above, in the example of Fig. 1, all coaxial elements are prevented from moving in the axial direction, while the armatures $N_3$, $N_2$ and $N_1$ are mounted on crown-wheel B, planet-carrier A, sleeve $G_2$ and disc $C_2$, respectively, e. g. by means of splines, so as to be movable in the axial direction with respect to their carrying members, while being rotatively fast therewith. In the example shown, this is obtained by means of splines. It is clear that suitable elastic means may be provided to bring the armatures back into their neutral position once the corresponding electro-magnet is de-energized.

In Fig. 1, elastic means of this type are used to release armature $N_2$. Said means are constituted by springs such as $p$ interposed between armature $N_2$ and a shoulder $p_1$ provided on the planet-carrier. It is clear that similar means may be also provided for armatures N and $N_3$ as well as for disc $C_2$ which may be brought back into its mid-position by means of springs acting on either side thereof.

It is also to be noted that, as shown in dotted line on Fig. 1, the driving shaft may be fitted within the driven shaft so that, e. g. the driven part may be arranged between the engine and the gear-box. This arrangement also permits reducing the diameter of the central wheel and, therefore, those of the other members of the gearing, since that portion of the driving shaft which is located within the box on the left of central wheel $M_1$ is then no more used to transmit the torque, so that its diameter may be chosen as small as desired.

Finally, it is also to be noted that the gear-box shown in Fig. 1 is perfectly reversible since shafts R and M may both be used at will as driving or driven shafts.

Figure 2A:
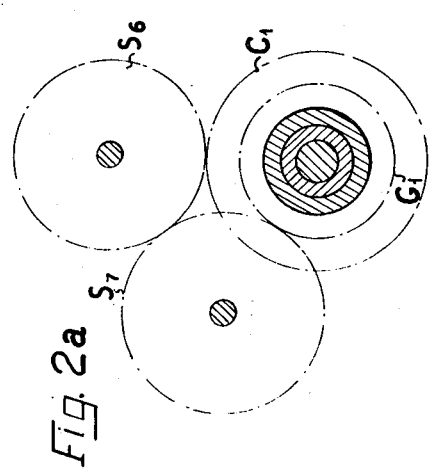
Fig. 2a is a diagrammatical partial section along line 2a—2a of Fig. 2.
Figure 2:
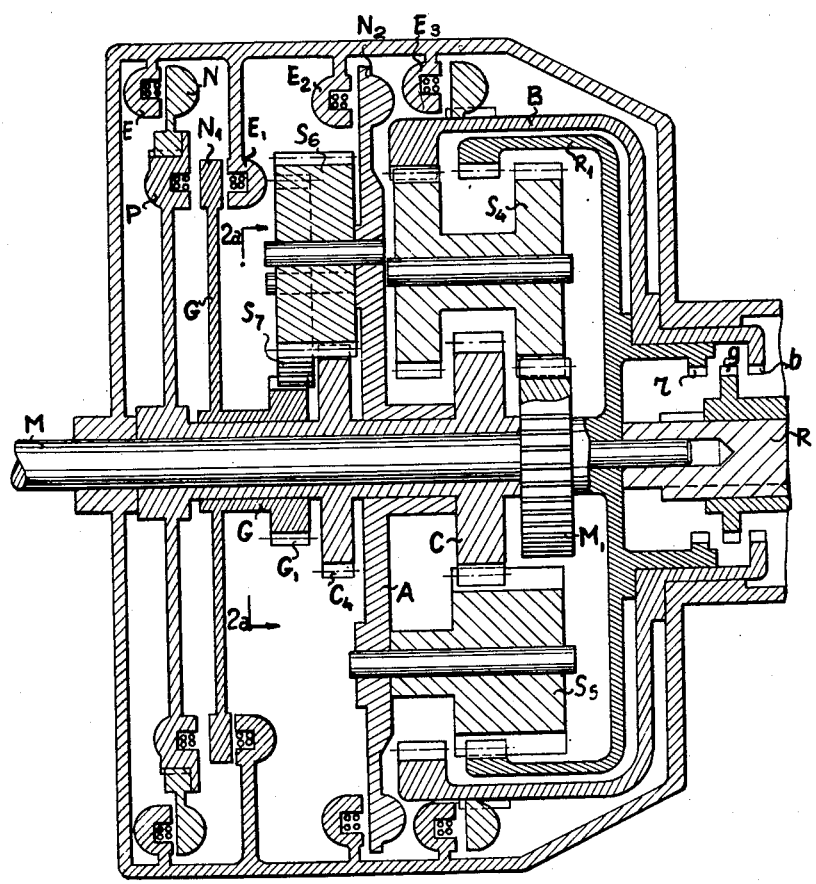
Fig. 2 is an axial sectional view of a change-speed gear-box according to another embodiment of the invention.

Referring now to Figs. 2 and 2a, there is shown an alternative embodiment slightly differing from that of Fig. 1. In this example, the crown-wheels B and $R_1$ have the same number of teeth, which may be advantageous to provide certain ratios; this arrangement was impossible in the case of Fig. 1, in which the planet-pinion $S_1$ was to be cleared off the teeth of the crown-wheel $R_1$. In the embodiment of Fig. 2, the planet-pinion $S_4$ interconnecting $M_1$ with B is provided with a cut-off portion instead of the planet-pinion $R_5$ interconnecting C with R, as previously.

Moreover, in the example of Fig. 2, the complementary train used for providing the 5th speed is also slightly modified. In this example, the planet-pinion $S_6$ of the complementary train pivots directly on disc A of the planet-carrier and meshes with a central wheel $C_4$ substituted for the crown-wheel $C_3$ of Fig. 1. Said planet-pinion $S_6$ meshes with a second planet-pinion $S_7$ (pivoted on disc A) which meshes in turn with a central wheel $G_1$ acting in the same manner as wheel $G_1$ of Fig. 1.

With this arrangement, the second disc of the planet-carrier and the sleeve interconnecting the two discs in the example of Fig. 1 may be omitted. Moreover, this arrangement also permits reducing the speeds of the planet-pinions around their axles.

In Fig. 2, the direct drive is still provided by making the "holdable" central wheel of the auxiliary train rotatively fast with the loose central wheel of the main train, which permits, as mentioned above, reducing the reaction torque between the members to be made fast with each other and, thence, reducing the power of electro-magnet P.

As shown in Fig. 2, sleeve G and the planet-carrier A are movable in the axial direction, which implies the use of straight teeth gears.

It is to be understood that the device of Fig. 2 may be modified so that it operates in the same conditions as that of Fig. 1, and vice-versa, within the scope of the invention.

It is also to be noted that the planet-pinion $S_5$ is shown in the lower part of Fig. 2 for the sake of clearness, while, as a matter of fact, it meshes with the planet-pinion $S_4$ as shown in Fig. 2a.

Referring now to Figs. 3 and 3a, there is shown a simplified embodiment in which the 5th speed provided by means of an auxiliary train is omitted. In this example, the epicyclic train does not comprise any cut-off planetary pinion. Moreover, in this example, the number of teeth of the crown-wheel $R_1$ is higher than that of crown-wheel B. In this example, there is shown at $M_1$ the driving central wheel and at C the loose central wheel, at A the planet-carrier and at B and $R_1$ the two inwardly toothed crown-wheels of which are constituted by bell-shaped members fitting into one another and the hubs of which are provided with dogs $r$, $b$, adapted to act in combination with the corresponding dogs $g$ of a sleeve $f$ slidably but non-rotatively mounted on the driven shaft R.

In Figs. 3 and 3a, there is shown an electro-magnet device permitting shifting the gear-box from forward drive to reversed drive and vice-versa, with a mid-position for declutching.

This device comprises three electro-magnets L, $L_1$ and $L_2$, the armature $L_3$ of which is supported by one end of a lever $F_1$ pivoted at $F_2$ and the other end of which is engaged in a collar carried by sleeve $f$. This mode of control, or any other one which would use an auxiliary power, permits controlling from a distance the displacement of the dogs.

It will be seen in Fig. 3 that all armatures are separate, elastic means being provided to hold each of them mechanically off its electro-magnet as long as it is not operative and an abutment being also provided to limit the action of each of said elastic means.

This arrangement permits avoiding the disadvantages of the double armatures having no drawback means which, when the electro-magnets are de-energized, are capable of remaining in contact under the action of magnetic remanence with either of said electro-magnets, which causes, in particular, heating, wear, difficulties for adjusting the device when the engine is running slowly, and so on.

The gear-box shown in Fig. 3 operates as follows:

The reversed drive is obtained by clutching dogs $g$ with dogs $b$ whereupon the planet-carrier I is held stationary by energizing electro-magnet L.

The dogs may be brought back into the resting position by energizing electro-magnet $L_2$.

The 1st speed is obtained by holding the planet-carrier A as previously, but only after having clutched dogs $g$ with dogs $r$ by energizing electro-magnet $E_2$.

The 2nd, 3rd and 4th speeds are obtained while leaving dogs G and R continuously clutched together.

The crown-wheel B is stopped for the 2nd speed while the disc $C_5$ fast with the loose central wheel C is stopped for the 3rd speed. The operation is similar to that described with reference to Fig. 1.

The direct drive (or 4th speed) is obtained by clutching directly the loose central wheel C with the driving shaft by energizing an electro-magnet $E_4$ carried by a disc $M_3$ keyed on the driving shaft, said electro-magnet acting upon an armature $N_4$ provided on disc $C_5$ rotatively fast with the loose central wheel C.

In this example, the toothings may be helical since neither disc B, nor planet-carrier A, nor again the loose central wheel C may move easily, due to the fact that they are mounted in abutment contact with one another and that, moreover, the armatures are capable of sliding, but not of rotating, with respect to the corresponding members.

In the example of Fig. 4, the same arrangements are used as in Fig. 3, except that both electro-magnets $E_2$ and $E_3$ are carried by the casing, so as to be slidable on pins such as U, which permits bringing said magnet into contact with either armature $N_2$ or $N_3$, respectively supported by planet-carrier A and outer crown-wheel B. In this example, the coaxial members are still so mounted as to be prevented from moving in the axial direction.

In the examples shown in the first four figures, the gear-box is of electro-magnetic type. However, as mentioned above, the invention is in no way limited to electro-magnetic gear-boxes.

Fig. 5 shows, as an illustration of this, an embodiment of a gear-box in which the coaxial members are selectively held stationary by friction. In this example, and according to another feature of the invention, the "holding" and clutching means are constituted by discs screwed in the casing body and capable of moving easily when imparted with an angular displacement.

The box shown in Fig. 5 is a 4-speed box, the general design of which is the same as in Fig. 4. However, the "holding" of crown-wheel B of the planet-carrier A and of the loose central wheel C, as well as the clutching of the latter with the driving shaft, are provided by friction clutches controlled by two discs X and Y screwed in inner threadings provided in the wall of casing K. Assuming the crown-wheel B is to be held stationary, nut X will be screwed down so as to move the same towards the right until it comes into operative contact with the left wall of disc $B_4$ which is slidably, but non rotatively, mounted on the crown-wheel B whereupon nut X brings disc $B_4$ against another disc fast with the casing when said disc $B_4$ is clamped between two stationary members, which holds the crown-wheel B stationary.

If the planet-carrier A is to be held stationary, disc X is screwed so as to move towards the left. During this motion, disc X will drive disc $A_5$ which is nonrotatively slidable with respect to the planet-carrier A; disc X then drives the nonrotatable disc $K_1$, so as to apply the same against the second disc $A_6$, to apply finally the latter against wall $K_2$ of the casing; both discs $A_5$ and $A_6$ rotatively fast with the planet-carrier A are thus each held between two rotatively stationary surfaces; by increasing the number of the discs, such as $A_5$ and $A_6$, fast with A, and of the nonrotatable discs, such as $K_1$, it is possible to reduce the stress to be exerted for balancing a given torque. This arrangement may be also used for the electro-magnetic control, X acting e. g. as an armature moving in the same manner as electro-magnet $E_3$ of Fig. 4 and $X_1$ acting as a stationary electro-magnet.

If the loose central wheel C is to be made fast with the driving shaft, nut Y will be screwed so as to move the same towards the left, which will result in pivoting a set of levers W mounted on a disc $M_7$, fast with shaft M and which drive, in turn, a disc $M_6$ rotatively fast with the driving shaft, said disc $M_6$ then applying a disc $C_7$ rotatively fast on sleeve $C_1$ against disc $M_7$ fast with the driving shaft. It will be noted that a ball thrust-bearing $y$ permits a relative motion between nut Y fast with the casing and levers W fast with the driving shaft, without giving rise to any prejudicial friction.

Figure 6:
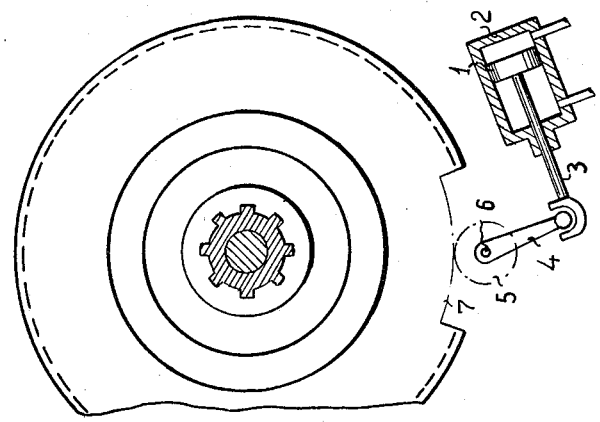
Fig. 6 is a detailed cross-section along line 6—6 of Fig. 5 of the control device.

In Fig. 6 which is a cross-section along line 6—6 of Fig. 5, are shown as a mere illustration hydraulic or pneumatic means of controlling nuts X and Y. In this figure, there is shown at 1 a piston capable of sliding in a cylinder 2, rod 3 of this piston being adapted to rotate through a lever 4 a pinion 5 around its stationary axle 6.

Pinion 5 meshes with a toothing provided on a portion of the periphery of both discs X and Y. It will be easily understood that the displacements of piston 1 in either directions cause a rotation in a corresponding direction of the relevant disc and, thence, its displacement in the corresponding axial direction.

Figure 7:
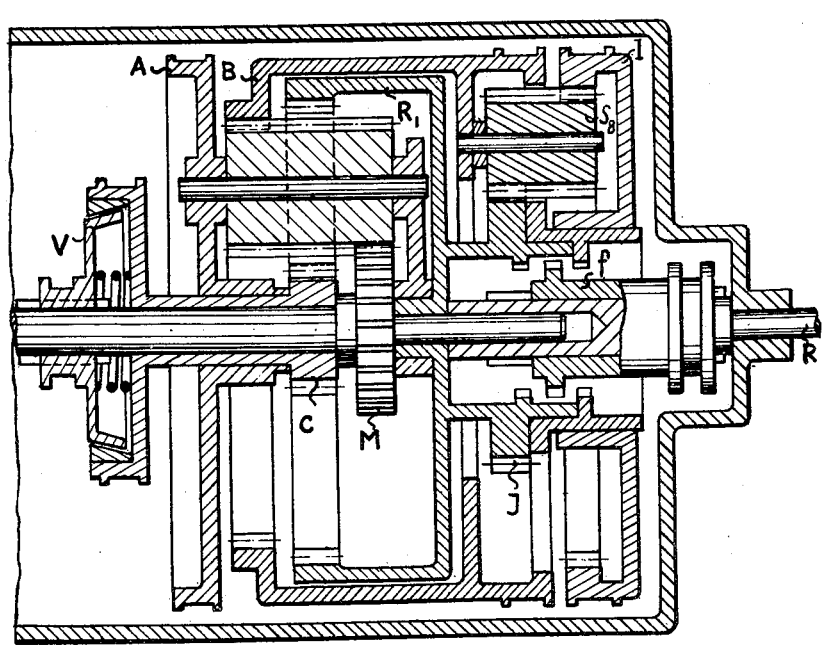
Fig. 7 is an axial sectional view of another embodiment of the invention.

There is shown in Fig. 7 a gear-box, the main wheel train of which is generally similar to that previously described with reference to the other figures; the main difference between that box and those shown in Figs. 1 and 2 is that the 5th speed is obtained in a different manner.

Moreover, the stopping of the loose coaxial members is obtained, in this example, by means of friction-bands, which constitutes another possible embodiment of a gear-box according to the invention.

In the example of Fig. 7, there is shown as previously at R the driven shaft, at $f$ a sleeve rotatively fast with said shaft, at B and $R_1$ the two innerly toothed crown-wheels, at A the planet-carrier, at $M_1$ the driving wheel and at C the loose central wheel. Wheel C, planet-carrier A and crown-wheel B are loose for the forward speeds and may be held stationary in the known manner by means of friction-bands. For direct drive, a clutch of any suitable type, such as a cone clutch shown at V, permits making the loose central wheel C fast with the driving shaft.

In the example shown, the geared-up 5th speed is obtained by means of a supplementary train comprising an inner toothed crown-wheel I, capable of being held stationary, a planet-pinion $S_8$ mounted on an axle supported by crown-wheel B and a central wheel G carried by crown-wheel $R_1$.

The 5th speed is obtained by holding with a friction-band crown-wheel I stationary. With this clutching, it will be easily understood that the central wheel $M_1$ rotates the crown-wheel $R_1$ through both intermeshing planet-pinions of the main wheel train, so that since the toothing J of crown-wheel $R_1$ meshes with planet-pinion $S_3$ which meshes in turn with the stationary crown-wheel I, the crown-wheel B rotates and drives in turn the planet-carrier A, which produces a geared-up speed of crown-wheel $R_1$ and, thence, of the driven shaft.

Figure 9:
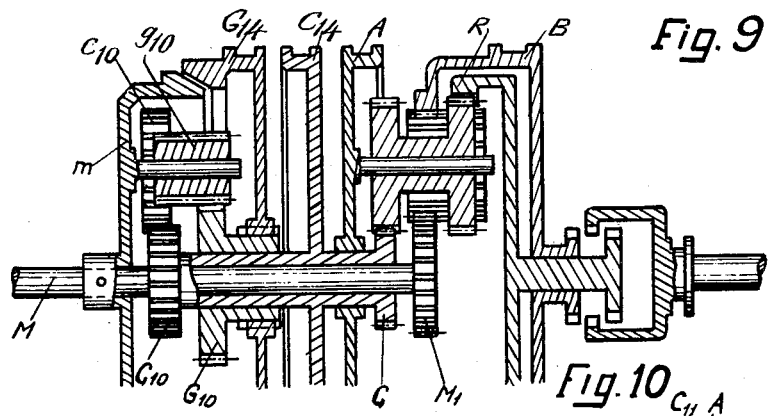
Fig. 9 is an axial partial section of another embodiment of a change-speed gear according to the invention, in which the 5th speed is geared up and obtained through a complementary train the planet-carrier of which is fast with the driving shaft.
Figure 9A:
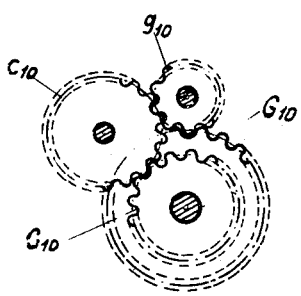
Fig. 9a shows the primitive circles of the wheel constituting the complementary train of Fig. 9 and their gearing points.

In the embodiment of Figs. 9 and 9a, it will be seen that the main wheel train is generally designed as previously.

As shown in Fig. 9, the complementary train comprises a planet-carrier constituted by a disc $m$ rotatively fast with the driving shaft M, said disc supporting the axles of the planet-pinions, while a central wheel $C_{10}$ is fast with the central wheel C, a second central wheel $G_{10}$ being rotatively linked with a drum $G_{14}$.

Wheels $C_{10}$ and $G_{10}$ are interconnected through two planet-pinions $g_{10}$ and $c_{10}$, respectively, meshing with one another, one of them, $c_{10}$ also meshing with the central wheel $C_{10}$, while the other pinion $g_{10}$ also meshes with the central wheel $G_{10}$.

In the example shown in Fig. 9, for the sake of clearness, the planet-pinion $c_{10}$ has been rotated in the plane of the figure and it has been assumed to be located behind the planet-pinion $g_{10}$. It will be understood that, with this arrangement, the driving shaft M is only surrounded by two sleeves, one of which is fast with the central wheels C and $C_{10}$ and the other one of which is fast with wheel $G_{10}$.

In the example of Fig. 9, there is obtained a geared-up 5th speed. The following numbers of teeth may be given as an illustration:

$$M_1 = 19$$
$$B = 51$$
$$C = 13$$
$$R = 55$$

By holding stationary planet-carrier A, the crown-wheel B and the disc $C_{14}$ fast with the central wheels C and $C_{14}$, respectively, the following ratios may be obtained:

$$0.346$$
$$0.525$$
$$0.735$$

By making fast with one another, by any suitable means, the two members constituting the epicyclic set, it is possible to obtain the direct drive, i. e. ratio 1.

By choosing for wheels $C_{10}$ and $G_{10}$ of the complementary train the following numbers of teeth:

$$C_{10} = 20$$
$$G_{10} = 28$$

there is obtained, when holding wheel $G_{10}$ stationary, a geared-up speed giving ratio 1.37.

It will be understood that the numbers of teeth of the planet-pinions have no influence upon the value of this ratio. It is also to be noted that, in the example of Fig. 9, the holding means are diagrammatically shown in the form of brake drums A, B, $C_{14}$ and $G_{14}$, respectively, while the direct drive clutch is diagrammatically shown in the form of two cones, male and female, one of which is fast with M, the other being fast with drum $G_{14}$. It will be understood that, as in the previous embodiment, the stopping of these four members may be obtained by electro-magnetic means. In the example of Fig. 9, the reversed drive is obtained by using crown-wheel B as driven member, as described previously; in said reversed drive, the complementary train plays no part. With the above numbers of teeth, the reversed drive ratio is 0.37.

Figure 10:
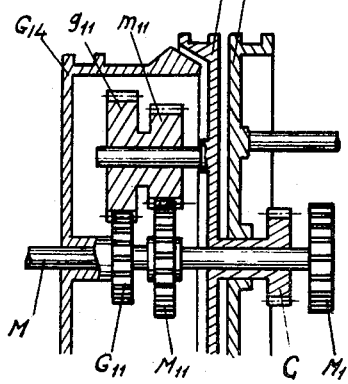
Fig. 10 is a partial axial section showing a 5th speed complementary train also providing a geared-up speed the planet-carrier being, in this example, fast with the member which is to be held stationary to provide the 3rd speed.

In the example of Fig. 10, there is still obtained a geared-up 5th speed, but in this example, the planet-carrier of the complementary train is fast with the central wheel C, the axles of planet-pinions being carried by a disc $c_{11}$ fast with said central wheel C. The two other members of the complementary train which, in the embodiments of Figs. 1, 2 and 9, rotated in opposite directions, now rotate in the same direction. A wheel-train, such as, when the planet-carrier is stationary, the two other members of the train rotate in opposite directions, will be called a "negative train," while a wheel-train such as, in the same conditions, the two above-mentioned members rotate in the same direction, will be called a "positive train." The example of Fig. 10 shows a positive train. The driving shaft carries a central wheel $M_{11}$ while a second central wheel $G_{11}$ is carried by a drum $G_{14}$ capable of being held stationary. A planet-pinion, the axle of which is carried by disc $C_{11}$ fast with wheel C, meshes by one of its toothings $g_{11}$ with wheel $G_{11}$ and by its other toothing $m_{11}$ with the central wheel $M_{11}$. With the following numbers of teeth:

$$G_{11} = 18$$
$$g_{11} = 27$$
$$M_{11} = 24$$
$$m_{11} = 21$$

there is obtained, when holding wheel $G_{14}$ stationary, for the same number of teeth of the wheels of the main train the same geared-up ratio as in the preceding case, i. e. 1.37. The direct drive may be obtained by clutching member $C_{11}$ with member $G_{14}$, as diagrammatically shown in Fig. 12, or C with A, and so on.

In the constructive embodiment of Fig. 10, one of the partitions which were required with the previous embodiments may be omitted. This is due to the fact that, while e. g. in the embodiment of Fig. 9, it was necessary to provide three partitions, one on member C, another on member G and a third one on member M, the latter is suppressed in the example of Fig. 10.

In Fig. 11, is shown another embodiment in which a geared-up 5th speed is still obtained by holding a planet-carrier stationary. This example shows another manner of using a positive train.

The planet-carrier capable of being held stationary is shown at $G_{12}$ and is connected through a gear 7 to the driving shaft M on which is rotatively fast a central wheel $M_{12}$ and to the central wheel C which is fast with a second central wheel $C_{12}$, wheels $M_{12}$ and $C_{12}$ pertaining to the complementary train, the planet-carrier of which is constituted by member $G_{12}$. In this example, a double planetary pinion, the axle of which is carried by member $G_{12}$, comprises two toothings, one of which, $m_{12}$ meshes with the central wheel $M_{12}$, while the other one $c_{12}$ meshes with the central wheel $C_{12}$.

With the following numbers of teeth:

$$M_{12} = 27$$
$$m_{12} = 15$$
$$C_{12} = 18$$
$$c_{12} = 24$$

there is obtained, for the same numbers of teeth of the wheels of the main train, the same geared-up ratio, i. e. 1.37. The direct drive may be obtained by clutching $G_{12}$ with $C_{14}$ which is fast with the central wheel C and with $C_{12}$.

The three above-mentioned examples of Figs. 11, 12 and 13 show three embodiments of the complementary train by means of which any desired ratio may be obtained for the geared-up 5th speed by using at will as a planet-carrier either a member fast with the driving shaft, or a member fast with the central wheel C, or again a member adapted to be held stationary to provide said 5th speed, while in Figs. 1 and 2 the planet-carrier was common to the complementary and main trains.

It is thus clear that the 5th speed may be obtained by choosing as a planet-carrier one of the four members described above. In the examples which have been just described, there is obtained a geared-up 5th speed.

As shown in Fig. 12, it is also possible to obtain a geared-down 5th speed and this with any desired ratio.

As shown in Fig. 12, there is used a negative train with an innerly toothed crown-wheel, comprising a central wheel $C_{13}$ fast with the central wheel C capable of being held stationary, as diagrammatically shown in $C_{15}$, an innerly toothed crown-wheel $M_{13}$ fast with the driving shaft and a planet-pinion $c_{10}$ meshing both with the central wheel $C_{13}$ and with the crown-wheel $M_{13}$, the axle of said pinion being carried by a member adapted to be held stationary and diagrammatically shown in the form of a drum $G_{13}$.

With the following numbers of teeth:

$$C_{13}=31$$
$$M_{13}=63$$

there is obtained, when holding member $G_{13}$ stationary and assuming the wheels of the main train have the same numbers of teeth as previously, a more reduced speed than all those provided by the main train. In the example shown, there is obtained a 0.20 ratio, while the lowest ratio of the main wheel train is, as mentioned above, 0.346.

It is clear that by choosing other numbers of teeth, as well as another arrangement of the complementary wheel train, it would be possible to obtain any ratio higher or lower than the lowest ratio provided by the combinations in which the main train is used.

Figure 8:
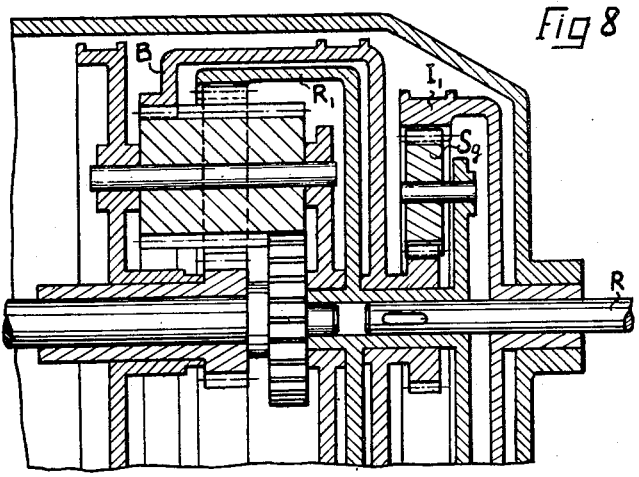
Fig. 8 is a partial axial section of a further embodiment of a gear-box according to the invention, in which the reversed drive is obtained without any dog-clutching.

In Fig. 8 is shown another embodiment of a mechanical gear-box. This figure shows a portion only of said box and, in particular, the output driven member fast with the driven shaft. In this example, both crown-wheel B and $R_1$ are carried, as previously, by bell-shaped members fitting in one another. However, for the reversed drive, the movement transmission is obtained without any axial displacement of any member rotatively fast with the driven shaft. Said member is substituted for, in the example shown, by a complementary crown-wheel $I_1$ meshing with a planet-pinion $S_9$ mounted on a shaft carried by crown-wheel $R_1$ and also meshing with a central wheel fast with crown-wheel B. It will be understood that it suffices to hold crown-wheel $I_1$ stationary to reverse the drive, the driven shaft always remaining fast with crown-wheel $R_1$.

It is to be understood that the invention is in no way limited to the embodiments described and shown and that many constructive modifications may be made thereto within the scope of the invention. In particular, any electro-magnetic or mechanical control may be used at will, whichever may be the gearing type chosen; a 5th speed, geared-up or not, may be used or not, one of the other speeds may be omitted in the case when, in particular, a complementary train is provided for giving a geared-up speed, etc. It is to be particularly noted that, whichever may be the combination chosen, each speed including the reversed drive is obtained by stopping one single member, which offers, in particular, in the case of electro-magnetic gear-boxes, a considerable advantage by reducing the current power to be consumed.

What is claimed is:

1. An epicyclic change-speed gear comprising a driving shaft and a driven shaft having a common axis, a first central wheel rotating with said driving shaft, four coaxial members including a second central wheel, two innerly toothed crown-wheels constituted by bell-shaped members and a planet-carrier, said planet-carrier carrying at least two intermeshing planetary pinions, one of which also meshes with one central wheel and with one crown-wheel in a same radial zone and the other of which also meshes with the other central wheel and with the other crown-wheel in two different radial zones located on either side of said first mentioned radial zone, three of said coaxial members being loosely mounted on their axles, means to prevent selectively one of said three loose members from rotating, means to make one of said bell-shaped members fast with the driven shaft for the reversed drive, means to make the other one fast with the driven shaft for all forward speeds, said other bell-shaped member being mounted within the first one and said bell-shaped members being provided with hubs located on the same side of the whole set of gears, dog clutching means on said hubs, a sleeve slidably but non-rotatably mounted on said driven shaft, dog-clutching means on said sleeve, and means to clutch selectively said sleeve dog-clutching means with the clutching means of one of said hubs, so as to make one of said crown-wheels rotatively fast with said driven shaft.

2. An epicyclic gear according to claim 1, in which the means to prevent selectively one of said three loose members from rotating includes electro-magnets to control at least a number of said rotation-preventing means, a separate armature for each of said electro-magnets, elastic means to hold said armature off the corresponding electro-magnet whenever the same is de-energized and abutment means to limit the stroke of said armature.

3. An epicyclic change-speed gear according to claim 1, in which the planetary pinion, meshing with the crown-wheel which is made fast with the driven shaft for the reversed drive, is provided with a cut-off portion to accommodate the central wheel meshing with the other planetary pinion.

4. An epicyclic gear according to claim 1, in which the planetary pinion, meshing with the crown-wheel which is made fast with the driven shaft for the forward speeds, is provided with a cut-off portion so that the driving side portion of said planetary pinion and the central wheel meshing therewith may be given a reduced width with respect to the other members of the gear and so as to accommodate the central wheel meshing with the other planetary pinion.

5. An epicyclic change-speed gearing comprising a driving shaft and a driven shaft having a common axis, a main gear train constituted by five coaxial members including two central wheels, two innerly toothed bell-shaped crown-wheels, one of which is mounted within the other and the hubs of which are located on the same side of the gearing and a planet-carrier, said planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make a selected one of said coaxial members rotatively fast with said driving shaft and another selected one of said coaxial members relatively fast with said driven shaft, the three other coaxial members being loosely mounted on their axles, means to prevent selectively one of said three loose members from rotating to obtain selectively one of three speeds, a secondary gear train constituted by three members, two of which are operatively connected each with a selected one of said five coaxial members of the main train, means to make any two of said main and secondary train members fast with one another to obtain direct drive, and means to prevent the third of said three secondary train members from rotating to obtain a fifth speed.

6. An epicyclic change-speed gearing comprising a driving shaft and a driven shaft having a common axis, a main gear train constituted by five coaxial members including two central wheels, two innerly toothed bell-shaped crown-wheels one of which is mounted within the other and the hubs of which are located on the same side of the gearing and a planet-carrier, said planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make a selected one of said coaxial members rotatively fast with said driving shaft and another selected one of said coaxial members rotatively fast with said driven shaft, the three other coaxial members being loosely mounted on their axles, means to prevent selectively one of said three loose members from rotating to obtain selectively one of three speeds, a secondary gear train constituted by three members, two of which are operatively connected each with a selected one of said five coaxial members of the main train, means to make the third of said members rotatively fast with any member selected among the set containing the five coaxial members of the main train and said two first members of the secondary train to obtain direct drive and means to prevent said third member from rotating to obtain a fifth speed.

7. An epicyclic change-speed gearing comprising a driving shaft and a driven shaft having a common axis, a main gear train constituted by five coaxial members including two central wheels, two innerly toothed bell-shaped crown-wheels one of which is mounted within the other and the hubs of which are located on the same side of the gearing and a planet-carrier, said planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make a selected one of said coaxial members rotatively fast with said driving shaft and another selected one of said coaxial members rotatively fast with said driven shaft, the three other coaxial members being loosely mounted on their axles, one of said loose members being constituted by a loose central wheel, means to prevent selectively one of said three loose members from rotating to obtain selectively one of three speeds, a secondary gear train constituted by three members comprising said planet-carrier, a central wheel and a crown-wheel rotatively fast with said loose central wheel, means to make any two of said main and secondary train members rotatively fast with one another to obtain direct drive and means to prevent the said central wheel of the secondary train from rotating to obtain a fifth speed.

8. An epicyclic change-speed gearing comprising a driving shaft and a driven shaft having a common axis, a main gear train constituted by five coaxial members including two central wheels, two innerly toothed bell-shaped crown-wheels one of which is mounted within the other and the hubs of which are located on the same side of the gearing and a first planet-carrier, said first planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make a selected one of said coaxial members rotatively fast with said driven shaft, the three other coaxial members being loosely mounted on their axles, one of said loose members being constituted by a loose central wheel, means to prevent selectively one of said three loose members from rotating to obtain selectively one of three speeds, a secondary gear train constituted by three members, comprising a second planet-carrier rotatively fast with the driving shaft, a first central wheel rotatively fast with said loose central wheel and a second central wheel, said second planet-carrier carrying two intermeshing planetary pinions each of which also meshes with one of said first and second central wheels, means to make any two of said main and secondary members rotatively fast with one another to obtain direct drive and means to prevent said second central wheel from rotating to obtain a geared-up fifth speed.

9. An epicyclic change-speed gearing comprising a driving shaft and a driven shaft having a common axis, a main gear train constituted by five coaxial members including two central wheels, two innerly toothed bell-shaped crown-wheels one of which is mounted within the other and the hubs of which are located on the same side of the gearing and a planet-carrier, said planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make a selected one of said coaxial members rotatively fast with said driving shaft and another selected one of said coaxial members rotatively fast with said driven shaft, the three other coaxial members being loosely mounted on their axles, means to prevent selectively one of said three loose members from rotating to obtain selectively one of three speeds, means to make any two of said five members rotatively fast with one another to obtain direct drive, an auxiliary train and means to prevent one member of said auxiliary train from rotating to obtain the reversed drive.

10. An epicyclic change-speed gearing comprising a driving shaft and a driven shaft having a common axis, a main gear train constituted by five coaxial members including two central wheels, an outer innerly toothed bell-shaped crown-wheel, an inner innerly toothed bell-shaped crown-wheel mounted within said outer crown-wheel, the hubs of both said crown-wheels being located on the same side of the gearing and a planet-carrier, said planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make said inner crown-wheel rotatively fast with said driven shaft and a selected one of the four other coaxial members rotatively fast with said driving shaft, the three other coaxial members being loosely mounted on their axles, means to prevent selectively one of said three loose members from rotating to obtain selectively one of three speeds, means to make any two of said five members rotatively fast with one another to obtain direct drive, an auxiliary train comprising an innerly toothed crown-wheel, a central wheel rotatively fast with said outer crown-wheel and a planetary pinion carried by said inner crown-wheel, said planetary pinion meshing with said auxiliary train crown-wheel and with said auxiliary train central wheel and means to prevent said auxiliary train crown-wheel from rotating to obtain the reversed drive.

11. An epicyclic change-speed gearing comprising a driving shaft and a driven shaft having a common axis, five coaxial members including a first and a second central wheel, a first and a second bell-shaped innerly toothed crown-wheels, one of which is mounted within the other, the hubs of both said crown-wheels being located on the same side of the gearing, dog-clutching means on said hubs, a sleeve slidably but non-rotatably mounted on said driven shaft, dog-clutching means on said sleeve, means to clutch selectively said sleeve dog-clutching means with the dog-clutching means of one of said crown-wheels for reversed drive and with the dog-clutching means of the other crown-wheel for all forward speeds, and a planet-carrier, said planet-carrier carrying at least two intermeshing planetary pinions, one of which also meshes with one central wheel and with one crown-wheel in a same axial plane and the other of which also meshes with the other central wheel and with the other crown-wheel in two different axial planes located on either side of said first mentioned axial plane, means to make a selected one of the four coaxial members which are not rotatively fast with the driven shaft rotatively fast with the driving shaft, the three other coaxial members being loosely mounted on their axles, one of said loose members being constituted by a loose central wheel, means to prevent selectively one of said three loose members from rotating to obtain selectively one of three speeds including the reversed drive, a third innerly toothed loose crown-wheel, a third central wheel rotatively fast with the crown-wheel which is clutched with the driven shaft for all forward speeds, a planetary pinion carried by the crown-wheel, which is clutched with the driven shaft for reversed drive, said planetary pinion meshing with said third crown-wheel and with said third central wheel, means to make said loose central wheel rotatively fast with said driving shaft to obtain the direct drive and means to prevent said third loose crown-wheel from rotating to obtain a fifth speed.

POL RAVIGNEAUX.

REFERENCES CITED

The following references are of record in the file of this patent:

UNITED STATES PATENTS

| Number | Name | Date |
|---|---|---|
| 798,746 | De Normanville | Sept. 5, 1905 |
| 980,407 | Clarke | Jan. 3, 1911 |
| 1,217,059 | Pollard | Feb. 20, 1917 |
| 1,383,988 | De Normanville | July 5, 1921 |
| 2,123,770 | Cotal | July 12, 1938 |
| 2,351,061 | Meyer | June 13, 1944 |

FOREIGN PATENTS

| Number | Country | Date |
|---|---|---|
| 7,415 | Great Britain | Mar. 27, 1913 |
| 28,034 | Great Britain | Dec. 13, 1911 |
| 141,492 | Great Britain | Dec. 22, 1920 |
| 48,019 | France | Oct. 16, 1937 |
| 720,797 | Germany | May 15, 1942 |
| 809,102 | France | Feb. 24, 1937 |